(12) United States Patent
Gao et al.

(10) Patent No.: US 12,183,048 B2
(45) Date of Patent: Dec. 31, 2024

(54) IMAGE STITCHING METHOD, APPARATUS AND DEVICE BASED ON REINFORCEMENT LEARNING AND STORAGE MEDIUM

(71) Applicant: GUANGDONG UNIVERSITY OF TECHNOLOGY, Guangzhou (CN)

(72) Inventors: Jian Gao, Guangzhou (CN); Junlang Liang, Guangzhou (CN); Lanyu Zhang, Guangzhou (CN); Yuheng Luo, Guangzhou (CN); Zhuojun Zheng, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/767,924

(22) Filed: Jul. 9, 2024

(65) Prior Publication Data
US 2024/0378839 A1 Nov. 14, 2024

Related U.S. Application Data

(63) Continuation of application No. PCT/CN2023/122590, filed on Sep. 28, 2023.

(30) Foreign Application Priority Data

May 10, 2023 (CN) .......................... 202310518585.5

(51) Int. Cl.
*G06V 10/00* (2022.01)
*G06T 7/70* (2017.01)
(Continued)

(52) U.S. Cl.
CPC ................ *G06V 10/16* (2022.01); *G06T 7/70* (2017.01); *G06T 7/80* (2017.01); *G06V 10/761* (2022.01); *G06V 10/85* (2022.01)

(58) Field of Classification Search
None
See application file for complete search history.

(56) References Cited

U.S. PATENT DOCUMENTS

| 2015/0213633 | A1* | 7/2015 | Chang | ................. A61N 5/1065 |
|---|---|---|---|---|
| | | | | 382/284 |
| 2015/0248916 | A1* | 9/2015 | Kopf | ....................... G06T 7/557 |
| | | | | 386/278 |

(Continued)

FOREIGN PATENT DOCUMENTS

| CN | 106056600 A | 10/2016 |
|---|---|---|
| CN | 109064404 A | 12/2018 |

OTHER PUBLICATIONS

Luo Ruirong et al., "LED Defect Detection Algorithm with Adaptive Light Brightness", Modular Machine Tool & Automatic Manufacturing Technique, Issue 11, 43799, pp. 46-50.

(Continued)

*Primary Examiner* — Martin Mushambo (57) ABSTRACT

The present application provides an image stitching method, apparatus and device based on reinforcement learning and a storage medium. The method includes: acquiring initial calibration parameters, collecting a sample image and position information of a motion platform; setting a negative reward function; acquiring a state set and a negative reward value set according to a randomly generated action set, the initial calibration parameters, the position information of the motion platform and the negative reward function to construct a probability kinematics model; constructing a state value function based on an occurrence probability of the state, and acquiring an optimal action by optimizing the state value function; and acquiring optimized calibration parameters through the optimal action and the initial calibration parameters, and carrying out image stitching on corresponding sample images through the optimized calibration param- (Continued)

eters. The application solves the technical problem of low image stitching quality in the prior art.

6 Claims, 5 Drawing Sheets

(51) Int. Cl.
  *G06T 7/80* (2017.01)
  *G06V 10/10* (2022.01)
  *G06V 10/74* (2022.01)
  *G06V 10/84* (2022.01)

(56) References Cited

U.S. PATENT DOCUMENTS

| | | | | |
|---|---|---|---|---|
| 2016/0328998 A1* | 11/2016 | Pedersen | ............... | A61B 8/4245 |
| 2017/0287184 A1* | 10/2017 | Pettersson | ............... | G06F 18/22 |
| 2018/0253869 A1* | 9/2018 | Yumer | ............... | G06T 11/60 |
| 2019/0279337 A1* | 9/2019 | Cheng | ............... | G06T 3/4038 |
| 2022/0051145 A1* | 2/2022 | Zhang | ............... | G06N 20/10 |
| 2022/0187841 A1* | 6/2022 | Ebrahimi Afrouzi | ............... | |
| | | | | G05D 1/0274 |
| 2023/0135088 A1* | 5/2023 | Wang | ............... | B60W 40/09 |
| | | | | 701/23 |

OTHER PUBLICATIONS

Li Yan et al., "Generic and Automatic Markov Random Field-Based Registration for Multimodal Remote Sensing Image Using Grayscale and Gradient Information", remote sensing, 43317, pp. 1-20.

* cited by examiner

Fig. 7

IMAGE STITCHING METHOD, APPARATUS AND DEVICE BASED ON REINFORCEMENT LEARNING AND STORAGE MEDIUM

CROSS REFERENCE

The present disclosure is a continuation-application of International (PCT) Patent Application No. PCT/CN2023/122590, filed on Sep. 28, 2023, which claims priority of Chinese Patent Application No. 202310518585.5, filed on May 10, 2023, the entire contents of which are hereby incorporated by reference in their entirety.

TECHNICAL FIELD

The present application relates to the technical field of image processing and in particular to an image stitching method, apparatus and device based on reinforcement learning and a storage medium.

BACKGROUND OF THE PRESENT INVENTION

In the field of precision vision inspection, a high-resolution camera device with a telecentric lens is required to inspect a flexible circuit substrate, and a visual field of this camera is generally much smaller than an area of an object to be detected. Therefore, small-area image information of the object to be detected at different positions needs to be collected through the camera device, then an image stitching technology is used to stitch these small-area images at different positions into a large-area image according to an overlapping region, and the large-area image of the object is finally obtained for detection.

In a traditional image stitching method, it is generally necessary to calibrate external parameters and acquire physical information of a platform carrying an object to be detected, by converting an actual physical position into an image position, image stitching is carried out on two images according to the image position information, and after calibration, this method can realize real-time stitching only by an affine transformation matrix, with a fast stitching speed. However, when this method is used for calibration, it is difficult for a plane of the motion platform to be absolutely parallel to a plane of the camera, and the parameter calibration precision can be reduced when the external parameters are calibrated. In a movement process of the motion platform, the rotation by a certain degree of angle may be caused, which leads to the rotation of the object to be detected by a small angle at some moments. Therefore, it is difficult to ensure global stitching quality by directly using the initial calibration parameters obtained by calibration.

SUMMARY OF THE PRESENT INVENTION

The present application provides an image stitching method, apparatus and device based on reinforcement learning and a storage medium for improving the technical problem of low image stitching quality in the prior art.

In view of this, in a first aspect, the present application provides an image stitching method based on reinforcement learning, which includes the following steps of:

acquiring initial calibration parameters through a calibration board arranged on a motion platform, and collecting a sample image of a detected sample on the motion platform at each moment and position information of the motion platform at each moment in a movement process of the motion platform;

setting a negative reward function based on image stitching quality at each moment by taking the image stitching quality at each moment and the position information of the motion platform at each moment as a state at each moment and a calibration parameter adjustment amount at each moment as an action at each moment;

randomly generating an action set, and acquiring a state set and a negative reward value set according to the action set, the initial calibration parameters, the position information of the motion platform at each moment and the negative reward function;

constructing a Markov experience sequence according to the action set, the state set and the negative reward value set, and constructing a probability kinematics model through the Markov experience sequence, wherein the probability kinematics model is used for predicting an occurrence probability of a state at the next moment according to a state and action at a current moment;

constructing a state value function based on an occurrence probability of the state at each moment and a negative reward value at each moment, and acquiring an optimal action at each moment by optimizing the state value function; and acquiring optimized calibration parameters at each moment through the optimal action at each moment and the initial calibration parameters, and carrying out image stitching on corresponding sample images through the optimized calibration parameters at each moment.

Optionally, a calculation process of the image stitching quality includes:

after carrying out image stitching on sample images at two adjacent moments, capturing an overlapping region of a stitched image to obtain a first overlapping image and a second overlapping image; and calculating a similarity degree between the first overlapping image and the second overlapping image to obtain the image stitching quality.

Optionally, the state value function is:

$$V^{\pi\varphi}(s_0) = \sum_{t=0}^{T} \int c(s_t) p(s_t) ds_t;$$

wherein, $V^{\pi\varphi}(s_0)$ is the state value function, $s_0$ is a state at an initial moment, $\pi^\varphi$ is an action strategy, $s_t$ is a state at a moment t, $c(s_t)$ is a negative reward value corresponding to the state at the moment t, $p(s_t)$ is an occurrence probability of the state at the moment t, and T is a final moment.

Optionally, the carrying out image stitching on the corresponding sample images through the optimized calibration parameters at each moment, includes:

calculating a platform movement distance of the motion platform at each two adjacent moments according to the position information of the motion platform at each moment;

calculating an image translation distance of sample images at each two adjacent moments according to the optimized calibration parameters at each moment, the platform movement distance at each two adjacent moments and the position information of the motion platform at each moment; and carrying out image stitching on the sample images at each two adjacent moments based on the image translation distance of the sample images at each two adjacent moments.

In a second aspect, the present application provides an image stitching apparatus based on reinforcement learning, which includes:

a calibration and image acquisition unit configured for acquiring initial calibration parameters through a calibration board arranged on a motion platform, and collecting a sample image of a detected sample on the motion platform at each moment and position information of the motion platform at each moment in a movement process of the motion platform;

a setting unit configured for setting a negative reward function based on image stitching quality at each moment by taking the image stitching quality at each moment and the position information of the motion platform at each moment as a state at each moment and a calibration parameter adjustment amount at each moment as an action at each moment;

an acquisition unit configured for randomly generating an action set, and acquiring a state set and a negative reward value set according to the action set, the initial calibration parameters, the position information of the motion platform at each moment and the negative reward function;

a model construction unit configured for constructing a Markov experience sequence according to the action set, the state set and the negative reward value set, and constructing a probability kinematics model through the Markov experience sequence, wherein the probability kinematics model is used for predicting an occurrence probability of a state at the next moment according to a state and action at a current moment;

an optimization unit configured for constructing a state value function based on an occurrence probability of the state at each moment and a negative reward value at each moment, and acquiring an optimal action at each moment by optimizing the state value function; and a stitching unit configured for acquiring optimized calibration parameters at each moment through the optimal action at each moment and the initial calibration parameters, and carrying out image stitching on corresponding sample images through the optimized calibration parameters at each moment to obtain an optimized stitched image.

Optionally, a calculation process of the image stitching quality includes:

after carrying out image stitching on sample images at two adjacent moments, capturing an overlapping region of a stitched image to obtain a first overlapping image and a second overlapping image; and calculating a similarity degree between the first overlapping image and the second overlapping image to obtain the image stitching quality.

Optionally, the state value function is:

$$V^{\pi_\varphi}(s_0) = \sum_{t=0}^{T} \int c(s_t)p(s_t)ds_t;$$

wherein, $V^{\Phi_\varphi}(s_0)$ is the state value function, $s_0$ is a state at an initial moment, $\pi_\varphi$ is an action strategy, $s_t$ is a state at a moment t, $c(s_t)$ is a negative reward value corresponding to the state at the moment t, $p(s_t)$ is an occurrence probability of the state at the moment t, and T is a final moment.

Optionally, the stitching unit is specifically configured for:

acquiring optimized calibration parameters at each moment through the optimal action at each moment and the initial calibration parameters;

calculating a platform movement distance of the motion platform at each two adjacent moments according to the position information of the motion platform at each moment;

calculating an image translation distance of sample images at each two adjacent moments according to the optimized calibration parameters at each moment, the platform movement distance at each two adjacent moments and the position information of the motion platform at each moment; and carrying out image stitching on the sample images at each two adjacent moments based on the image translation distance of the sample images at each two adjacent moments.

In a third aspect, the present application provides an image stitching device based on reinforcement learning, wherein the device includes a processor and a storage;

the storage is used for storing a program code and transmitting the program code to the processor; and the processor is used for executing the image stitching method based on reinforcement learning in the first aspect based on an instruction in the program code.

In a fourth aspect, the present application provides a computer-readable storage medium, wherein the computer-readable storage medium is used for storing a program code, and the program code, when executed by a processor, realizes the image stitching method based on reinforcement learning in the first aspect.

It can be seen from the technical solution above that the present application has the following advantages:

The present application provides the image stitching method based on reinforcement learning, which includes the following steps of: acquiring the initial calibration parameters through the calibration board arranged on the motion platform, and collecting the sample image of the detected sample on the motion platform at each moment and the position information of the motion platform at each moment in the movement process of the motion platform; setting the negative reward function based on the image stitching quality at each moment by taking the image stitching quality at each moment and the position information of the motion platform at each moment as the state at each moment and the calibration parameter adjustment amount at each moment as the action at each moment; randomly generating the action set, and acquiring the state set and the negative reward value set according to the action set, the initial calibration parameters, the position information of the motion platform at each moment and the negative reward function; constructing the Markov experience sequence according to the action set, the state set and the negative reward value set, and constructing the probability kinematics model through the Markov experience sequence, wherein the probability kinematics model is used for predicting the occurrence probability of the state at the next moment according to the state and action at the current moment; constructing the state value function based on the occurrence probability of the state at each moment and the negative reward value at each moment, and acquiring the optimal action at each moment by optimizing the state value function; and acquiring the optimized calibration parameters at each moment through the optimal action at each moment and the initial calibration parameters, and carrying out image stitching on the corresponding sample images through the optimized calibration parameters at each moment.

In the present application, after the initial calibration parameters are acquired through the calibration board, the negative reward function is set based on the image stitching quality by taking the image stitching quality and the position information of the motion platform as the state and the calibration parameter adjustment amount as the action, so that the state value function is constructed; calibration parameters in different positions are optimized by optimizing the state value function, so that a local error of the calibration parameters is corrected online; and a hardware stitching coefficient is optimized by a reinforcement learning method to achieve the purpose of improving the image stitching quality, so that the technical problem of low image stitching quality in the prior art is improved.

DESCRIPTION OF THE DRAWINGS

In order to illustrate technical solutions in embodiments of the present application or in the prior art more clearly, the drawings which need to be used in describing the embodiments or the prior art will be briefly introduced hereinafter. Apparently, the drawings described hereinafter are only some embodiments of the present application, those of ordinary skills in the art may obtain other drawings according to these drawings without going through any creative work.

DETAILED DESCRIPTION OF PREFERRED EMBODIMENTS

In order to make those skilled in the art better understand the solution of the present application, technical solutions in embodiments of the present application are clearly and completely described with reference to the drawings in the embodiments of the present application. Apparently, the described embodiments are merely some but not all of the embodiments of the present application. Based on the embodiments of the present application, all other embodiments obtained by those of ordinary skills in the art without going through any creative work should fall within the scope of protection of the present application.

Traditional image stitching methods are generally divided into a software stitching method and a hardware stitching method, wherein in the software stitching method, feature point information of overlapping parts of two pictures is generally detected, feature points of the two pictures are compared to calculate position and shape transformation of the two pictures, and the overlapping parts are fused to realize image stitching; and in the hardware stitching method, it is generally necessary to calibrate external parameters and acquire physical information of a platform carrying an object to be detected, and by converting an actual physical position into an image position, the two pictures are stitched according to image position information. In general, the software stitching method has better stitching quality, but it takes a long time, so as to be unable to achieve real-time stitching, while the hardware stitching method can realize real-time stitching only by an affine transformation matrix after calibration, but it has high requirements for hardware and motion control precision of a platform. The hardware stitching method usually has a fast speed, but it has stitching quality lower than that of the software stitching method. Therefore, how to design a high real-time and high precision stitching method is an urgent problem to be solved in the industry.

In order to improve the above problem, the present application improves the hardware stitching method, and based on the hardware stitching method, initial calibration parameters are used as prior information, and reinforcement learning is used to optimize the calibration parameters, so as to improve the stitching quality of the hardware stitching method while ensuring the stitching speed. The reinforcement learning includes acquiring state information, setting a reward function, and outputting an optimal action according to a state and the reward function. For easy understanding, with reference to FIG. 1, an embodiment of the present application provides an image stitching method based on reinforcement learning, which includes the following steps.

Figure 1:
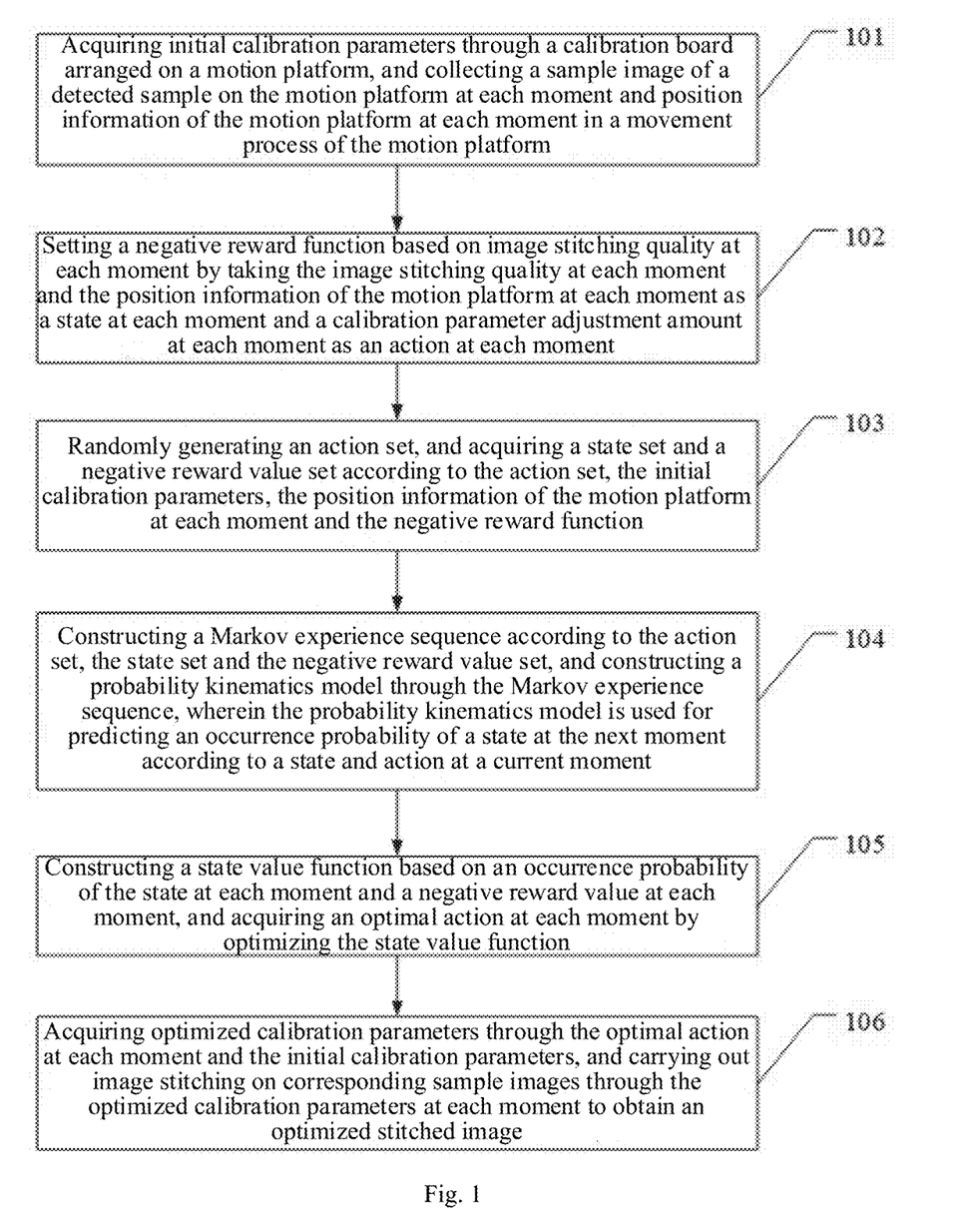
FIG. 1 is a flowchart of an image stitching method based on reinforcement learning provided by an embodiment of the present application.

In step 101, initial calibration parameters are acquired through a calibration board arranged on a motion platform, and a sample image of a detected sample on the motion platform at each moment and position information of the motion platform at each moment are collected in a movement process of the motion platform.

Figure 2:
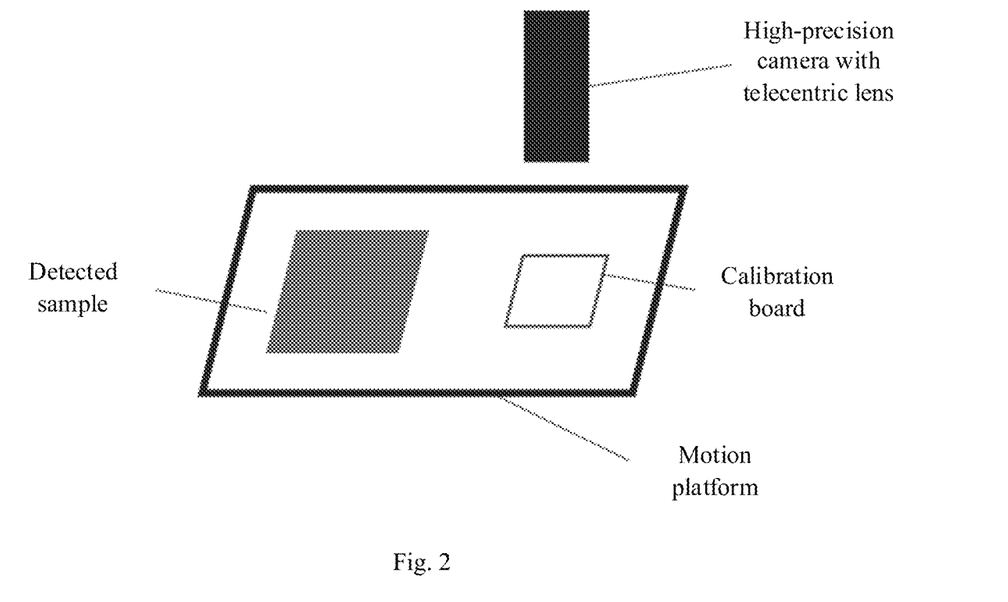
FIG. 2 is a schematic structural diagram of an image stitching system provided by the embodiment of the present application.

When the sample image of the detected sample is collected and image stitching is carried out, a camera, the motion platform, the detected sample, the calibration board and an industrial personal computer are needed, referring to FIG. 2 (excluding the industrial personal computer). The camera is a high-resolution camera with a telecentric lens, and the calibration board and the detected sample are fixed on the motion platform. During movement of the motion platform, the detected sample and the calibration board make two-dimensional movement along with the motion platform, the camera collects the sample images to the industrial personal computer, and the industrial personal computer carries out image stitching on the sample images.

Figure 3:
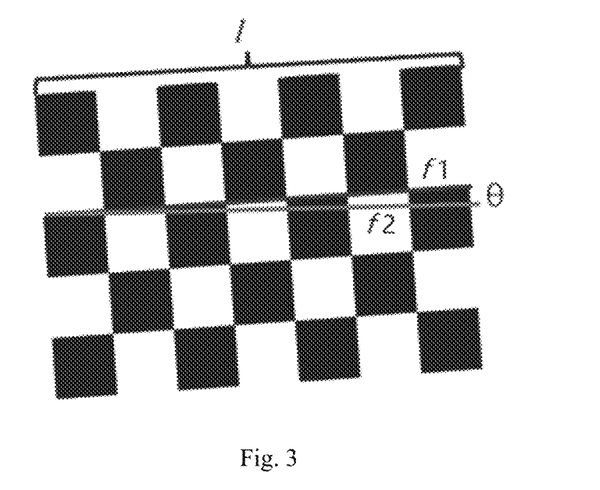
FIG. 3 is a schematic diagram of a checkerboard calibration board provided by the embodiment of the present application.

Because the high-resolution camera with the telecentric lens has an extremely low distortion coefficient, it is unnecessary to calibrate internal parameters, and the image stitching aims at two-dimensional movement plane stitching. Therefore, in the embodiment of the present application, the external parameters which are namely a scale and an angle are mainly calibrated during parameter calibration, and may be acquired through the checkerboard calibration board as shown in FIG. 3. When an actual physical length of a selected checkerboard is L and a length of a checkerboard of a checkerboard image collected by the camera is I, the scale p=L/l may be calculated; a checkerboard line f1 is obtained by identifying and connecting angular points of a square in the checkerboard image, the angle θ may be acquired by calculating an included angle between the checkerboard line f1 and a horizontal line f2, and the scale and the angle calibrated by the calibration board are the initial calibration parameters.

The position information of the motion platform is acquired through a precision plane detection device of a precision motion platform, and the motion platform feeds back the position information during movement. Position information fed back by the motion platform at a moment t is set to be $(P_{x_t}, P_{y_t})$, position information fed back by the motion platform at a moment t−1 is $(P_{x_{t-1}}, P_{y_{t-1}})$ and a movement distance between the moment t and the previous moment t−1 is $(\Delta P_{x_t}, \Delta P_{y_t}) = (P_{x_t} - P_{x_{t-1}}, P_{y_t} - P_{y_{t-1}})$. When two-dimensional movement coordinates of the sample image at the moment t−1 are set to be $(x_{t-1}, y_{t-1})$, two-dimensional movement coordinates $(x_t, y_t)$ of the sample image at the moment t may be obtained by carrying out affine transformation through the scale ρ and the angle θ obtained by calibration above, which are:

$$\begin{pmatrix} x_t \\ y_t \end{pmatrix} = \frac{1}{\rho} \begin{bmatrix} \cos\theta & -\sin\theta \\ \sin\theta & \cos\theta \end{bmatrix} \begin{bmatrix} \Delta P_{x_t} \\ \Delta P_{y_t} \end{bmatrix} + \begin{pmatrix} x_{t-1} \\ y_{t-1} \end{pmatrix}.$$

After calibration by the camera, the motion platform is moved to a starting point position of the detected sample capable of being measured by the camera. In a time period from the moment t−1 to the moment t, a platform movement distance $(\Delta P_{x_t}, \Delta P_{y_t})$ of the motion platform is mapped into an image translation distance $(\Delta x_t, \Delta y_t)$, and based on the image translation distance $(\Delta x_t, \Delta y_t)$, the image stitching may be carried out on the sample image at the moment t−1 and the sample image at the moment t. However, it is considered in the embodiment of the present application that, in an actual physical system, it is difficult for a plane of the motion platform to be absolutely parallel to a plane of the camera, and the precision of the scale and the angle can be reduced when the external parameters are calibrated. In a movement process of the motion platform, the rotation by a certain degree of angle may be caused, which leads to the rotation of the detected sample by a small angle at some moments. Therefore, it is difficult to ensure global image stitching quality by directly using initial calibration parameters obtained by calibration. In the embodiment of the present application, real-time scale compensation and angle compensation are carried out according to structural characteristics and movement of the platform based on the external parameters calibrated, and then image stitching is carried out through calibration parameters (optimized calibration parameters) obtained by compensation, so as to improve the global image stitching quality.

In step 102, a negative reward function is set based on image stitching quality at each moment by taking the image stitching quality at each moment and the position information of the motion platform at each moment as a state at each moment and a calibration parameter adjustment amount at each moment as an action at each moment.

In order to optimize the global image stitching quality, in the embodiment of the present application, the calibration parameters are automatically optimized by constructing a state, an action and a reward function of an agent, and image stitching is carried out according to the optimized calibration parameters.

In the embodiment of the present application, the image stitching quality at each moment and the position information $(P_{x_t}, P_{y_t})$ of the motion platform at each moment are taken as a state at each moment, which is namely $S_t = [\delta_t, P_{x_t}, P_{y_t}]$, where $s_t$ is a state at the moment t, and $\delta_t$ is image stitching quality at the moment t; and the calibration parameter adjustment amount $(\Delta \rho_t, \Delta \theta_t)$ at each moment is taken as an action at each moment, which is namely $a_t = [\Delta \rho_t, \Delta \theta_t]$, wherein $a_t$ is an action at the moment t, $\Delta \rho_t$ is a scale adjustment amount at the moment t, and $\Delta \theta_t$ is an angle adjustment amount at the moment t. When an initial scale obtained by calibration is set to be $\rho_0$ and an initial angle is set to be $\theta_0$, a scale used for image stitching at the moment t is $\rho_t = \rho_0 + \Delta \rho_t$ and an angle used for image stitching at the moment t is $\theta_t = \theta_0 + \Delta \theta_t$. The negative reward function is set based on the image stitching quality at each moment, and in order to facilitate subsequent gradient calculation, the negative reward function is used in the embodiment of the present application, and the negative reward function is $c_t = 1 - \delta_t$, with the goal of minimizing the negative reward function $c_t$ to maximize $\delta_t$.

In the embodiment of the present application, the initial scale and the initial angle acquired by the calibration board are used as prior information for subsequent optimization of the scale and the angle, and this process is intended to improve a convergence speed of a calibration parameter optimization process. If the initial scale and the initial angle acquired by the calibration board are not used, a reasonable action range cannot be provided for calibration parameter optimization, which easily causes non-convergence or a slow optimization speed of strategy optimization, thus leading to the failure of the calibration parameter optimization. The process of taking the initial calibration parameters acquired by the calibration board as the prior information and then carrying out the calibration parameter optimization according to the prior information is better than a process of simply using reinforcement learning to output the calibration parameters, and solves the shortcoming of instability of simply using reinforcement learning.

Further, in the embodiment of the present application, a calculation process of the image stitching quality includes:
after carrying out image stitching on sample images at two adjacent moments, capturing an overlapping region of a stitched image to obtain a first overlapping image and a second overlapping image; and
calculating a similarity degree between the first overlapping image and the second overlapping image to obtain the image stitching quality.

Figure 4:
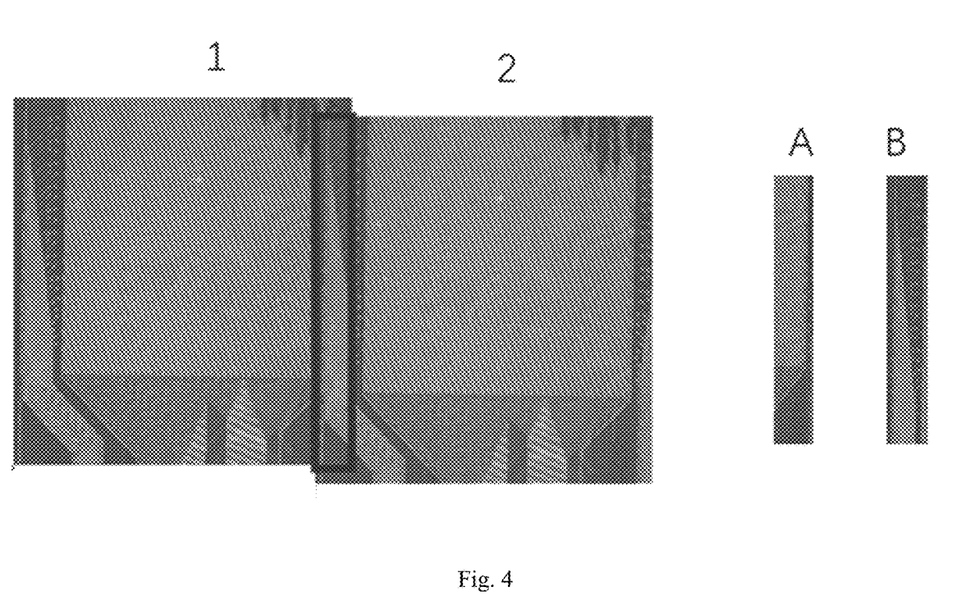
FIG. 4 is a schematic diagram of a stitched image provided by the embodiment of the present application.

With reference to FIG. 4, an image 1 and an image 2 in FIG. 4 are the sample images at two adjacent moments. After the image stitching is carried out on the image 1 and the image 2, there will be the overlapping region, which is namely a position of a rectangular frame in FIG. 4, and the first overlapping image and the second overlapping image may be obtained by capturing the overlapping region, which are an image A and an image B in FIG. 4. The image stitching quality of the stitched image obtained by stitching the image 1 and the image 2 may be obtained by calculating a similarity degree between the image A and the image B. Specifically, the similarity degree between the two images may be acquired by calculating a structural similarity index measure between the two images, and certainly, the similarity degree between the two images may also be calculated by other methods. In the embodiment of the present application, the method of calculating the similarity degree between the images by calculating the structural similarity index measure between the images is taken as an example for description, wherein a similarity degree value (SSIM value) between the image A and the image B is obtained by calculating the structural similarity index measure between the image A and the image B, so that the image stitching quality (SSIM value) after stitching the image 1 and the image 2 is obtained. A calculation formula of the structural similarity index measure SSIM(A, B) between the image A and the image B is:

$$SSIM(A, B) = [l(A, B)]^{\alpha}[c(A, B)]^{\beta}[s(A, B)]^{\gamma}.$$

$$l(A, B) = \frac{2\mu_A\mu_B + c_1}{\mu_A^2 + \mu_B^2 + c_1}.$$

$$c(A, B) = \frac{2\sigma_A\sigma_B + c_2}{\sigma_A^2 + \sigma_B^2 + c_2}.$$

$$s(A, B) = \frac{\sigma_{AB} + c_3}{\sigma_A\sigma_B + c_3}.$$

wherein, l(A, B) is a brightness comparison result between the image A and the image B, c(A, B) is a contrast comparison result between the image A and the image B, s(A, B) is a structure comparison result between the image A and the image B, $\mu_A$ and $\mu_B$ are pixel average values of the image A and the image B respectively, $\sigma_A$ and $\sigma_B$ are pixel standard deviations of the image A and the image B respectively, and $\sigma_{AB}$ is a pixel covariance between the image A and the image B; $c_1$, $c_2$ and $c_3$ are all constants; and $\alpha$, $\beta$ and $\gamma$ are a brightness, a contrast and a structural importance coefficient respectively. A value range of SSIM(A, B) is [0, 1], and the higher the value of SSIM(A, B), the higher the similarity degree between the image A and the image B, and the higher the image stitching quality.

In step 103, an action set is randomly generated, and a state set and a negative reward value set are acquired according to the action set, the initial calibration parameters, the position information of the motion platform at each moment and the negative reward function.

After the state, the action and the negative reward function are defined, the action set $\{a_1, a_2, \ldots, a_w\}$ may be randomly generated according to value ranges of a scale adjustment amount $\Delta\rho_t$ and an angle adjustment amount $\Delta\theta_t$, wherein w is a total number of actions randomly generated. According to the generated action set, the initial calibration parameters, the position information of the motion platform at each moment and the negative reward function, a corresponding state set $\{s_1, s_2, \ldots, s_w\}$ and a corresponding negative reward value set $\{c_1, c_2, \ldots, c_w\}$ are acquired. The value ranges of the scale adjustment amount and the angle adjustment amount may be determined according to setting parameters of the camera. Specifically, the value ranges of the scale adjustment amount and the angle adjustment amount may be set according to a ratio of a resolution of the camera to a physical size of a measured object, precision required by a stitching operation and temperature drift stability of the camera. Because different stitching operations require different precision and performances of the camera are different in different points, it is necessary to select appropriate value ranges according to an actual stitching operation.

In step 104, a Markov experience sequence is constructed according to the action set, the state set and the negative reward value set, and a probability kinematics model is constructed through the Markov experience sequence, wherein the probability kinematics model is used for predicting an occurrence probability of a state at the next moment according to a state and action at a current moment.

One Markov experience sequence $\{(s_1,a_1,s_1',c_1),(s_2,a_2,s_2',c_2), \ldots ,(s_w,a_w, s_w',c_w)\}$ may be constructed according to the action set, the state set and the negative reward value set, wherein $s_1'$, is a state at the next moment following a moment of a state $s_1$, $s_2'$ is a state at the next moment following a moment of a state $s_2$, and $s_w'$ is a state at the next moment following a moment of a state $s_w$.

The probability kinematics model $s_i'=f(s_i,a_i)$ may be constructed through the Markov experience sequence above, and the probability kinematics model may predict a state at the next moment according to a state and action at a current moment. The probability kinematics model may be fitted by a deep learning method, a neural network is trained by taking the state action set $\{(s_1, a_1),(s_2, a_2), \ldots, (s_i, a_i), \ldots,(s_w, a_w)\}$ as input data of the neural network and the state $\{S_1', S_2', \ldots, S_i', \ldots, S_w'\}$ at the next moment as a label of the neural network, $s_0$ as to acquire the probability kinematics model. When a state s(t−1) and action a(t−1) at a moment t−1 are input to the probability kinematics model, the occurrence probability $p(s_t)$ of the state s(t) at the next moment may be automatically output.

In step 105, a state value function is constructed based on an occurrence probability of the state at each moment and a negative reward value at each moment, and an optimal action at each moment is acquired by optimizing the state value function.

The occurrence probability $p(s_t)$ of the state at each moment may be predicted through the probability kinematics model, and the state value function may be obtained by multiplying the occurrence probability of the state by the negative reward value, which is:

$$V^{\pi_\varphi}(s_0) = \sum_{t=0}^{T} \int c(s_t)p(s_t)ds_t;$$

wherein, $V^{\pi_\varphi}(s_0)$ is the state value function, $s_0$ is a state at an initial moment, $\pi_\varphi$ is an action strategy, $\pi_\varphi$, is a strategy function about the action $a_t$, which may be a linear strategy function or a nonlinear strategy function, $s_t$ is a state at a moment t, $c(_{st})$ is a negative reward value corresponding to the state at the moment t, $p(s_t)$ is an occurrence probability of the state at the moment t, and T is a final moment.

When the state value function is optimized, a value of the state value function is minimized to achieve a maximum reward. The probability $p(s_t)$ output by the probability kinematics model is substituted into the state value function, and the minimum value is acquired by gradient calculation of the state value function, so that an optimal action strategy $\pi_\varphi^*$ at the moment t is obtained, thus obtaining the optimal action $a_t^*, =(\Delta\rho_t^*,\Delta\theta_t^*)$ at the moment t. In the embodiment of the present application, model fitting is carried out according to data, the state value function is acquired through strategy evaluation according to the fitted probability kinematics model, then the strategy is optimized by minimizing the state value function, the current optimal action is output, and the calibration parameters are compensated online to maximize the image stitching quality, so as to improve the global image stitching quality. In the embodiment of the present application, in a process of image stitching by hardware, the initial calibration parameters are acquired through calibration by a hardware system to ensure the convergence of calibration parameter optimization, a local error of the initial calibration parameters obtained by the hardware system is compensated through the calibration parameter optimization, so as to realize organic combination of software and hardware, and improve the image stitching quality while ensuring a real-time performance of image stitching. In the embodiment of the present application, aiming at a temperature drift characteristic of the camera under long-term operation, the probability kinematics model is constructed first, and model-based reinforcement learning is used to avoid the problem of low data use efficiency in model-free reinforcement learning.

In step 106, optimized calibration parameters at each moment are acquired through the optimal action at each moment and the initial calibration parameters, and image stitching is carried out on corresponding sample images through the optimized calibration parameters at each moment to obtain an optimized stitched image.

After the optimal action $(\Delta\rho_t^*, \Delta\theta_t^*)$ at the moment t is acquired, optimized calibration parameters $(\rho_t=\rho_0+\Delta\rho_t^*, \theta_t=\theta_0+\Delta\theta_t^*)$ at the moment t are acquired through the optimal action at the moment t and the initial calibration parameters, and then image stitching may be carried out on a sample image at the moment t and a sample image at a moment t+1 through the optimized calibration parameters at the moment t. A platform movement distance of the motion platform at each two adjacent moments is calculated according to the position information of the motion platform at each moment; an image translation distance of sample images at each two adjacent moments is calculated according to the optimized calibration parameters at each moment, the platform movement distance at each two adjacent moments and the position information of the motion platform at each moment; and image stitching is carried out on the sample images at each two adjacent moments based on the image translation distance of the sample images at each two adjacent moments.

Figure 5:
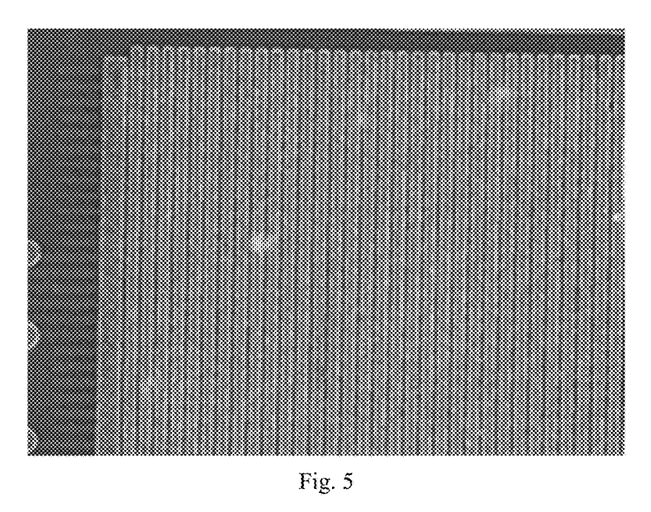
FIG. 5 is a schematic diagram of the stitched image obtained by image stitching with optimized calibration parameters provided by the embodiment of the present application.
Figure 6:
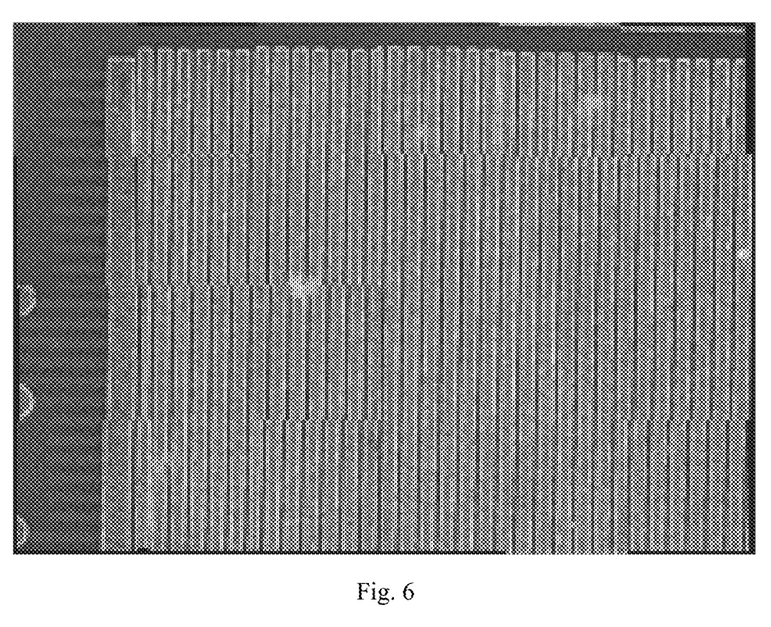
FIG. 6 is a schematic diagram of the stitched image obtained by image stitching with initial calibration parameters provided by the embodiment of the present application.

Taking the detection of a flexible printed circuit board as an example, the optimized calibration parameters acquired by the calibration parameter optimization above are used for image stitching, so as to obtain the stitched image as shown in FIG. 5, and the initial calibration parameters acquired by the calibration are directly used for image stitching, without carrying out the calibration parameter optimization, so as to obtain the stitched image as shown in FIG. 6. By comparing image stitching effects of the two methods, it can be found that the image stitching quality of FIG. 5 is obviously better than that of FIG. 6.

In the embodiment of the present application, after the initial calibration parameters are acquired through the calibration board, the negative reward function is set based on the image stitching quality by taking the image stitching quality and the position information of the motion platform as the state and the calibration parameter adjustment amount as the action, so that the state value function is constructed; calibration parameters in different positions are optimized by optimizing the state value function, so that a local error of the calibration parameters is corrected online; and a hardware stitching coefficient is optimized by a reinforcement learning method to achieve the purpose of improving the image stitching quality, so that the technical problem of low image stitching quality in the prior art is improved.

The above is one embodiment of the image stitching method based on reinforcement learning provided by the present application, and the following is one embodiment of an image stitching apparatus based on reinforcement learning provided by the present application.

Figure 7:
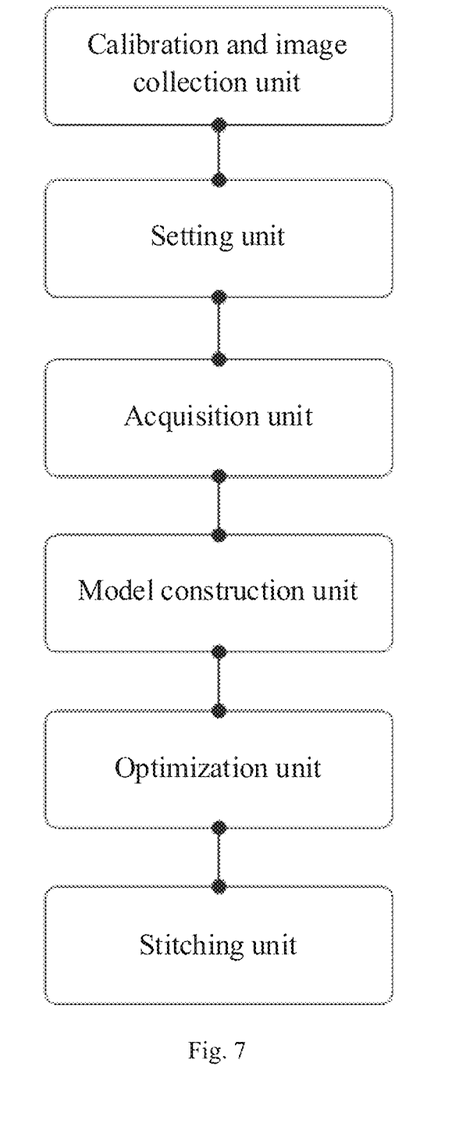
FIG. 7 is a schematic structural diagram of an image stitching apparatus based on reinforcement learning provided by an embodiment of the present application.

With reference to FIG. 7, the image stitching apparatus based on reinforcement learning provided by the embodiment of the present application includes:

a calibration and image collection unit configured for acquiring initial calibration parameters through a calibration board arranged on a motion platform, and collecting a sample image of a detected sample on the motion platform at each moment and position information of the motion platform at each moment in a movement process of the motion platform;

a setting unit configured for setting a negative reward function based on image stitching quality at each moment by taking the image stitching quality at each moment and the position information of the motion platform at each moment as a state at each moment and a calibration parameter adjustment amount at each moment as an action at each moment;

an acquisition unit configured for randomly generating an action set, and acquiring a state set and a negative reward value set according to the action set, the initial calibration parameters, the position information of the motion platform at each moment and the negative reward function;

a model construction unit configured for constructing a Markov experience sequence according to the action set, the state set and the negative reward value set, and constructing a probability kinematics model through the Markov experience sequence, wherein the probability kinematics model is used for predicting an occurrence probability of a state at the next moment according to a state and action at a current moment;

an optimization unit configured for constructing a state value function based on an occurrence probability of the state at each moment and a negative reward value at each moment, and acquiring an optimal action at each moment by optimizing the state value function; and a stitching unit configured for acquiring optimized calibration parameters at each moment through the optimal action at each moment and the initial calibration parameters, and carrying out image stitching on corresponding sample images through the optimized calibration parameters at each moment to obtain an optimized stitched image.

As a further improvement, a calculation process of the image stitching quality includes:

after carrying out image stitching on sample images at two adjacent moments, capturing an overlapping region of a stitched image to obtain a first overlapping image and a second overlapping image; and calculating a similarity degree between the first overlapping image and the second overlapping image to obtain the image stitching quality.

As a further improvement, the state value function is:

$$V^{\pi_\varphi}(s_0) = \sum_{t=0}^{T} \int c(s_t)p(s_t)ds_t;$$

wherein, $V^{\pi_\varphi}(s_0)$ is the state value function, $s_0$ is a state at an initial moment, $\pi_\varphi$, is an action strategy, $s_t$ is a state at a moment t, $c(s_t)$ is a negative reward value corresponding to the state at the moment t, $p(s_t)$ is an occurrence probability of the state at the moment t, and T is a final moment.

As a further improvement, the stitching unit is specifically configured for:
- acquiring optimized calibration parameters at each moment through the optimal action at each moment and the initial calibration parameters;
- calculating a platform movement distance of the motion platform at each two adjacent moments according to the position information of the motion platform at each moment;
- calculating an image translation distance of sample images at each two adjacent moments according to the optimized calibration parameters at each moment, the platform movement distance at each two adjacent moments and the position information of the motion platform at each moment; and
- carrying out image stitching on the sample images at each two adjacent moments based on the image translation distance of the sample images at each two adjacent moments.

In the embodiment of the present application, after the initial calibration parameters are acquired through the calibration board, the negative reward function is set based on the image stitching quality by taking the image stitching quality and the position information of the motion platform as the state and the calibration parameter adjustment amount as the action, so that the state value function is constructed; calibration parameters in different positions are optimized by optimizing the state value function, so that a local error of the calibration parameters is corrected online; and a hardware stitching coefficient is optimized by a reinforcement learning method to achieve the purpose of improving the image stitching quality, so that the technical problem of low image stitching quality in the prior art is improved.

The embodiment of the present application further provides an image stitching device based on reinforcement learning, wherein the device includes a processor and a storage;
- the storage is used for storing a program code and transmitting the program code to the processor; and
- the processor is used for executing the image stitching method based on reinforcement learning in the method embodiment above based on an instruction in the program code.

The embodiment of the present application further provides a computer-readable storage medium, wherein the computer-readable storage medium is used for storing a program code, and the program code, when executed by a processor, realizes the image stitching method based on reinforcement learning in the method embodiment above.

It can be clearly understood by those skilled in the art that, for the sake of convenience and brevity in description, a detailed working process of the foregoing apparatus and unit may refer to a corresponding process in the foregoing method embodiments, and will not be elaborated herein.

The terms "first", "second", "third", "fourth", and the like (if any) in the specification and the drawings of the present application above are used to distinguish similar objects, and are not necessarily used to describe a specific order or sequence. It should be understood that data used in this way may be interchanged under appropriate circumstances, so that the embodiments of the present application described herein can be implemented in a sequence other than those illustrated or described herein. In addition, the terms "comprising", "having" and any variations thereof are intended to cover non-exclusive inclusion. For example, a process, method, system, product or device comprising a series of steps or units is not necessarily limited to those steps or units clearly listed, but may include other steps or units not clearly listed in or inherent to the process, method, product or device.

It should be understood that, in the present application, "at least one (item)" refers to being one or more, and "multiple" refers to being two or more. "And/or" is used for describing the relationship between related objects, and indicates that there may be three relationships. For example, "A and/or B" may indicate that: A exists alone, B exists alone, and A and B exist at the same time, wherein A and B may be singular or plural. The symbol "/" generally indicates that there is a relationship of "or" between the related objects. "At least one (item) of the followings" or similar expression thereof refers to any combination of these items, comprising a singular (item) or any combination of plural (items). For example, at least one (item) of a, b or c may indicate: a, b, c, "a and b", "a and c", "b and c", or "a and b and c", wherein a, b and c may be singular or plural.

In the several embodiments provided in the present application, it should be understood that the disclosed apparatus and method may be implemented in other ways. For example, the foregoing apparatus embodiments are only illustrative. For example, the division of the units is only one logical function division. In practice, there may be other division methods. For example, multiple units or assemblies may be combined or integrated into another system, or some features may be ignored or not executed. In addition, the illustrated or discussed mutual coupling or direct coupling or communication connection may be indirect coupling or communication connection through some interfaces, devices or units, and may be in electrical, mechanical or other forms.

The units illustrated as separated parts may be or not be physically separated, and the parts displayed as units may be or not be physical units, which means that the parts may be located in one place or distributed on multiple network units. Some or all of the units may be selected according to actual needs to achieve the objects of the solutions of the embodiments.

In addition, each functional unit in each embodiment of the present application may be integrated in one processing unit, or each unit may exist alone physically, or two or more units may be integrated in one unit. The integrated units above may be implemented in a form of hardware, or may be implemented in a form of software functional unit.

The integrated units, if being implemented in the form of software functional unit and taken as an independent product to sell or use, may also be stored in one computer-readable storage medium. Based on such understanding, the essence of the technical solution of the present application, or a part contributing to the prior art, or all or a part of the technical solution may be embodied in a form of software product. The computer software product is stored in one storage medium including a number of instructions such that a computer device (which may be a personal computer, a server, or a network device, etc.) executes all or a part of steps of the method in the embodiments of the present application. Moreover, the foregoing storage medium includes: various media capable of storing the program code, such as a USB disk, a mobile hard disk, a Read-Only Memory (ROM), a Random Access Memory (RAM), a magnetic disk or an optical disk.

As described above, the embodiments above are only used to illustrate the technical solutions of the present application, and are not intended to limit the present application. Although the present application has been described in detail with reference to the above-mentioned embodiments, those of ordinary skills in the art should understand that: the technical solution recorded in the above-mentioned embodiments can still be modified, or equivalent substitutions can be made to a part of the technical features in the embodiments. However, these modifications or substitutions should not depart from the spirit and scope of the technical solution of the embodiments of the present application.

We claim:

1. An image stitching method based on reinforcement learning, comprising the following steps of:
   acquiring initial calibration parameters through a calibration board arranged on a motion platform, and collecting a sample image of a detected sample on the motion platform at each moment and position information of the motion platform at each moment in a movement process of the motion platform;
   setting a negative reward function based on image stitching quality at each moment by taking the image stitching quality at each moment and the position information of the motion platform at each moment as a state at each moment and a calibration parameter adjustment amount at each moment as an action at each moment;
   randomly generating an action set, and acquiring a state set and a negative reward value set according to the action set, the initial calibration parameters, the position information of the motion platform at each moment and the negative reward function;
   constructing a Markov experience sequence according to the action set, the state set and the negative reward value set, and constructing a probability kinematics model through the Markov experience sequence, wherein the probability kinematics model is used for predicting an occurrence probability of a state at the next moment according to a state and action at a current moment;
   constructing a state value function based on an occurrence probability of the state at each moment and a negative reward value at each moment, and acquiring an optimal action at each moment by optimizing the state value function; and
   acquiring optimized calibration parameters at each moment through the optimal action and the initial calibration parameters, and carrying out image stitching on corresponding sample images through the optimized calibration parameters at each moment.

2. The image stitching method based on reinforcement learning according to claim 1, wherein a calculation process of the image stitching quality comprises:
   after carrying out image stitching on sample images at two adjacent moments, capturing an overlapping region of a stitched image to obtain a first overlapping image and a second overlapping image; and
   calculating a similarity degree between the first overlapping image and the second overlapping image to obtain the image stitching quality.

3. The image stitching method based on reinforcement learning according to claim 1, wherein the state value function is:

$$V^{\pi\varphi}(s_0) = \sum_{t=0}^{T} \int c(s_t) p(s_t) ds_t;$$

wherein, $V^{\pi\varphi}(s_0)$ is the state value function, $s_0$ is a state at an initial moment, $\pi^\varphi$ is an action strategy, $s_t$ is a state at a moment t, $c(s_t)$ is a negative reward value corresponding to the state at the moment t, $p(s_t)$ is an occurrence probability of the state at the moment t, and T is a final moment.

4. The image stitching method based on reinforcement learning according to claim 1, wherein the carrying out image stitching on the corresponding sample images through the optimized calibration parameters at each moment, comprises:
   calculating a platform movement distance of the motion platform at each two adjacent moments according to the position information of the motion platform at each moment;
   calculating an image translation distance of sample images at each two adjacent moments according to the optimized calibration parameters at each moment, the platform movement distance at each two adjacent moments and the position information of the motion platform at each moment; and
   carrying out image stitching on the sample images at each two adjacent moments based on the image translation distance of the sample images at each two adjacent moments.

5. An image stitching device based on reinforcement learning, wherein the device comprises a processor and a storage;
   the storage is used for storing a program code and transmitting the program code to the processor; and
   the processor is used for executing the image stitching method based on reinforcement learning according to claim 1 based on an instruction in the program code.

6. A non-transitory computer-readable storage medium, wherein the non-transitory computer-readable storage medium is used for storing a program code, and the program code, when executed by a processor, realizes the image stitching method based on reinforcement learning according to claim 1.

* * * * *